C. E. HOLT.
CULTIVATOR.
APPLICATION FILED DEC. 15, 1917.

1,289,176.

Patented Dec. 31, 1918.
3 SHEETS—SHEET 1.

Inventor
Clarence E. Holt,
By
E. Hume Talbert
Attorney

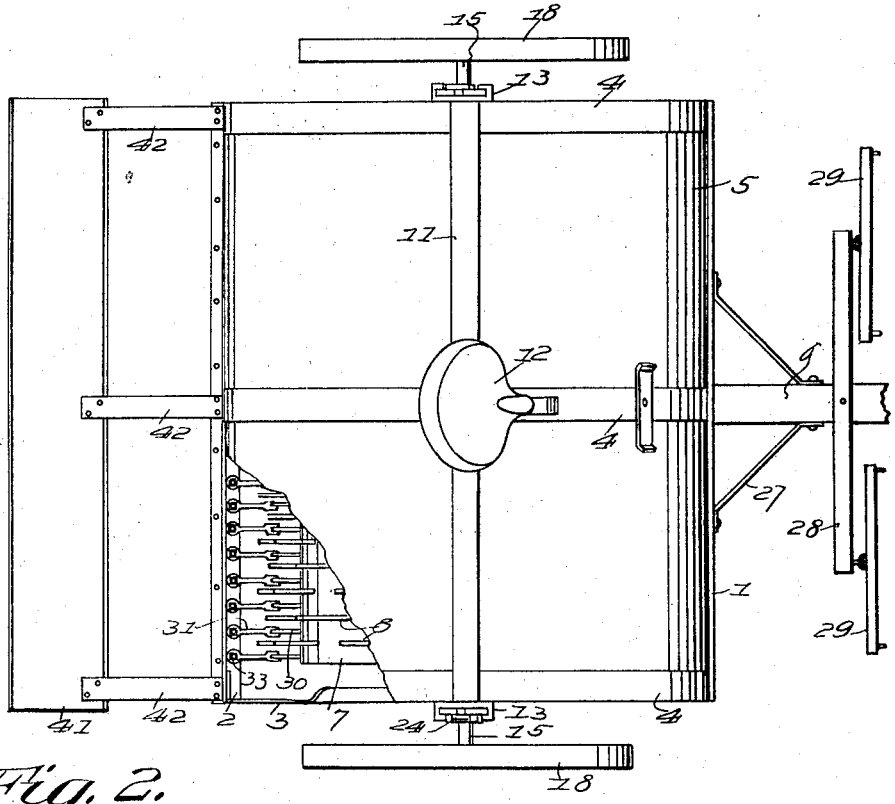
*Fig. 2.*
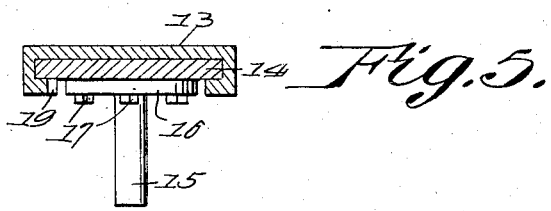
*Fig. 5.*
*Fig. 7.*
Inventor
Clarence E. Holt,
By
Attorney Inventor
Clarence E. Holt, By E. Hume Talbert
Attorney

UNITED STATES PATENT OFFICE.

CLARENCE E. HOLT, OF MAXWELL, OKLAHOMA.

CULTIVATOR.

1,289,176.   Specification of Letters Patent.   Patented Dec. 31, 1918.

Application filed December 15, 1917. Serial No. 207,275.

*To all whom it may concern:*

Be it known that I, CLARENCE E. HOLT, a citizen of the United States, residing at Maxwell, in the county of Pontotoc and State of Oklahoma, have invented new and useful Improvements in Cultivators, of which the following is a specification.

The invention has general reference to agricultural machines but is particularly a machine designed for pulverizing the soil.

Its principal object is to provide a machine of this character adapted to break the top crust of soils in alfalfa, wheat and oat fields and to that end is equipped with a drum provided with a plurality of teeth uniformly distributed over its cylindrical surface, the teeth being of such a conformation that they dig into the soil as the drum is moved over the latter, thereby thoroughly pulverizing the soil and transferring the surface moisture to the soil below the surface, so as to conserve the early spring moisture.

A further object of the invention is to provide a pair of wheels which may be regulated to permit the teeth of the drum to dig to a certain depth or to raise the teeth clear of the ground, so that the machine may be drawn over roads or streets without having the teeth contact with the latter.

A still further object is to provide a drag attached on the rear of the machine and designed to level the earth after it has been subjected to the digging operation of the drum.

A still further object is to provide a plurality of spring tensioned shovels dragging on the drum between the teeth of the latter, so that the drum may be kept free from clods of soil.

Other and further objects of the invention will be made to appear as its detail description progresses.

To the exact construction in which it is shown and described, the invention is not to be confined. The right is reserved to make such changes or alterations as the actual reduction to practice may suggest, provided such changes or alterations do not depart from the spirit of the subjoined claims.

The same numerals of reference designate the same parts throughout the several figures of the drawings, wherein:

Fig. 2 is a top plan view.

Fig. 5 is a section on the line 5—5 of Fig. 4.

Fig. 7 is a detailed sectional view showing the manner of attaching the teeth to the drum.

Figure 1:
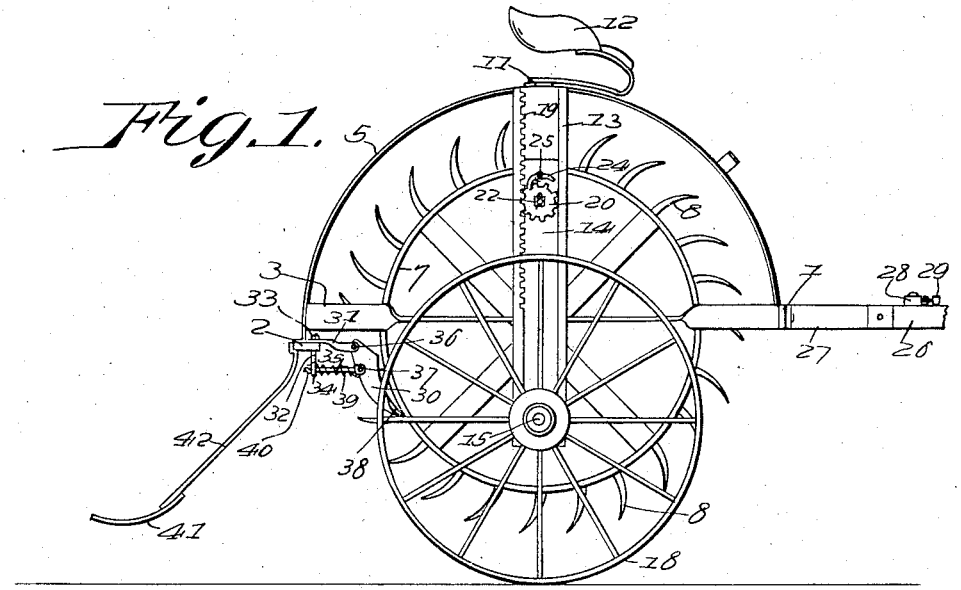
Figure 1 is a view in side elevation of the invention.
Figure 4:
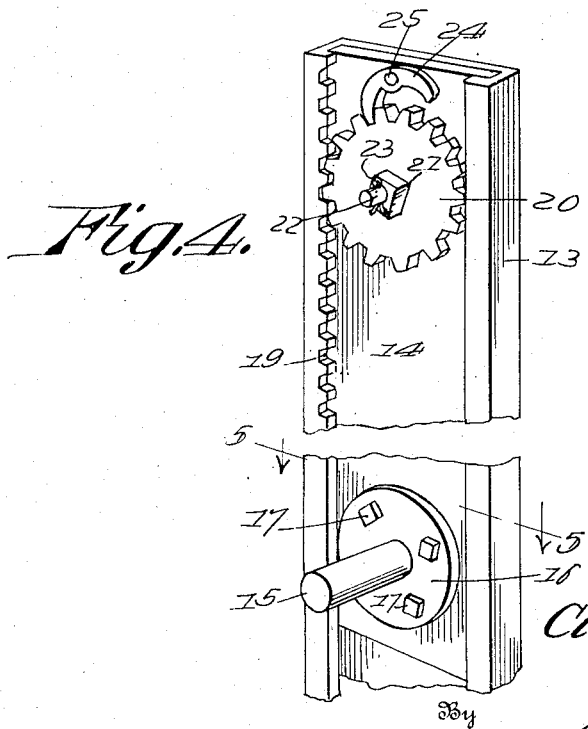
Fig. 4 is a detail view of one of the wheel carrying plates and that portion of the frame of the machine associated therewith.
Figure 3:
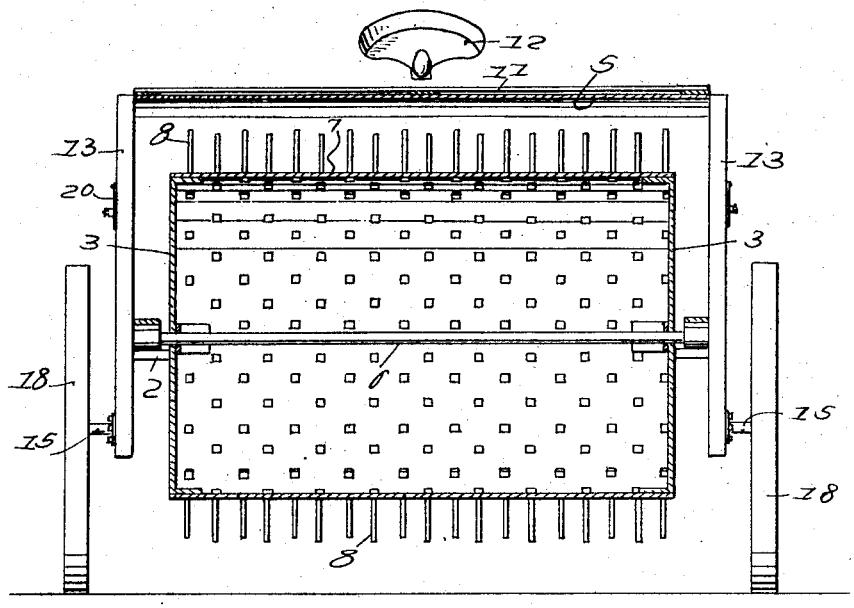
Fig. 3 is a longitudinal sectional view.
Figure 6:
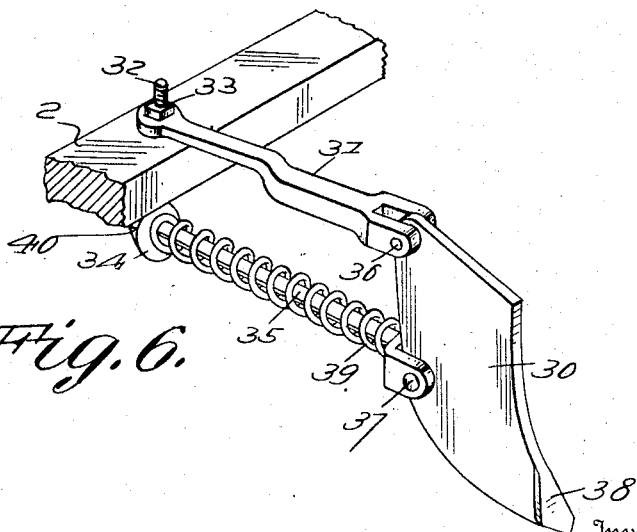
Fig. 6 is a perspective view of one of the drum cleaning scrapers and its attendant parts.

Referring now to the drawings, the invention is shown as being provided with a frame comprising a front beam 1, a rear beam 2 and side beams 3. At either side and in the middle the front and rear beams have attached between them the arch members 4 which are designed to hold a shield 5.

At substantially longitudinal centers of the side beams 3, appropriate bearings are formed in which are journaled shafts 6 which are connected one at either end of the drum 7.

The drum 7 is provided with a plurality of teeth 8 uniformly spaced from its cylindrical surface, these teeth being curved and tapering to points. The teeth are so positioned on the drum that they curve toward the front beam 1 when the drum is properly positioned in the frame. The drum 7 is made in the form of a hollow cylinder and the teeth 8 are attached to the cylindrical surface by means of nuts 9, the nuts 9 being threaded on to the shanks 10 of the teeth after the shanks have been passed through the cylindrical wall of the drum. The shanks 10 are made smaller in diameter than the diameter of the teeth where the latter adjoins the outer surface of the drum, thereby leaving shoulders which in conjunction with the nuts 9 operate to hold the teeth firmly in their proper positions on the drum.

A bar 11 is positioned transversely on the frame on top of the arch members 4, and a suitable seat 12 is attached to this bar where it adjoins the center arch member 4.

On either side of the frame there are vertical members 13 which connect with the side beams 3 at the longitudinal centers of the latter and rise upwardly connecting with the ends of the bar 11. These vertical members have a T-shaped slot formed longitudinally in their outer faces and each of these members carries in its T-shaped slot a plate member 14. Each plate 14 near its bottom end has a stub shaft appropriately affixed to it, that end of the shaft which is affixed to the plate having a base portion 16 through which appropriate cap screws 17 pass and thread into the plate, thereby affixing the stub shaft to the plate.

The stub shafts 15 are designed to carry the wheels 18 which are provided for the purpose of regulating the depth to which the teeth of the drum may dig and also for the purpose of raising the teeth of the drum clear of the ground when the machine is to be transported over roads or streets.

The vertical members 13 are each provided with a series of rack teeth 19 formed on one side of their T slots. Designed to mesh with these rack teeth 19, there are pinions 20 which are journaled on studs 21 that are affixed on the plates 14. The pinions 20 each has a lateral projection 22 formed on the opposite side from that which faces the plate 14. This lateral projection 22 is made square or hexagonal in plane and obtains in the center of the pinion, the stud 21 passing through it as well as through the pinion. To maintain the pinion 20 on the stud 21, a cotter pin 23 is provided which passes through that end of the stud 21 that protrudes through the lateral projection 22 of the pinion. Positioned above each pinion 20, there is a pivotally mounted pawl 24 which is supported on a pin 25 attached at the transverse center of the plate 14. This pawl is capable of engaging the teeth of the pinion 20 on either side of the center of the latter, and it is provided for the purpose of holding the pinion stationary to either retain the plate 14 and its attendant wheel elevated or to retain the frame and all its attendant parts elevated on the wheel. Its function will be more specifically described later.

To provide means for moving the drum and all its attendant parts, there is a tongue 26 attached to the frame at the longitudinal center of the front beam 1, and this tongue is braced by means of diagonally disposed members 27 which are attached to the tongue on opposite sides thereof and which are also attached to the front beam 1 near its ends. The conventional whiffle tree 28 with its attendant swingle trees 29 is attached to the tongue, so that the machine as a whole may be drawn by a beam.

As a means for keeping the drum clean of clods of dirt and the like, a plurality of scrapers 30 are provided. These are mounted on the rear beam 2 by means of arms 31 which are attached at uniformly spaced intervals along the top of the beam and receive nuts 33 on their upper threaded ends, the nuts being screwed down against the arms 31 to hold the latter in place, the bolts 32 having shoulders formed below the beams to preclude them being drawn farther than the specified distance through the beam when the nuts 33 are attached. The shorter portions of the bolts 32 terminate in eyes 34 with which bars 35 slidably engage. The scrapers 30 are pivotally attached to the ends of the arms 31 by means of pins 36 and the bars 35 also effect pivotal connection with the scrapers by means of pins 37. The scrapers 30 are so shaped as to follow substantially the outline of the drum and their free ends terminate in cutting edges 38 which are held against the surface of the drum by springs 39 which are pressed between the eyes 34 of the bolts 32 and those edges of the scrapers where the bars 35 adjoin the latter. Those ends of the bars 35 which project over the eyes 34 of the bolts 32 are adapted to receive nuts 40 which, through the pressure of the spring 39, are caused to abut the eyes, thus providing means for adjusting the cutting edges 38 of the scrapers with reference to the surface of the drum.

A drag beam 41 is provided and is designed to follow and to be drawn by the machine. This drag beam is appropriately connected with the frame by means of bars 42 which have hinged connections with the rear beam 2 and with the bar.

The machine is designed for cultivating the soil of alfalfa, wheat, or oat fields. When drawn by a team the teeth 8 of the drum dig into the ground, thereby loosening and pulverizing the upper crust of the soil and turning in all superficial moisture. The depth to which the teeth dig may be regulated by the proper adjustment of the wheels 18 and this adjustment is obtained by the use of a suitable wrench on the square or hexagonal lateral projections 22 of the pinions 20. Holding the pawl 24 out of engagement with the teeth of either pinion 20 will permit that pinion to be turned by the wrench which is attached to its lateral projection 22. This turning operation of the pinion 20 serves to raise or lower the plate 14, depending upon the direction in which the pinion is turned. If the pinion is turned in such a direction as to lower the wheel, the latter may be brought into contact with the ground, when continued movement of the pinion in the same direction will serve to elevate the frame and with it the drum after the wheel has been brought into contact with the ground. Shifting the pawl 24 on its pin 25 so that it contacts with the teeth of the pinion 20 on that side of the center of the pinion opposite from the teeth 19 formed in the T-slot of the vertical member 13 will operate to preclude any reverse movement of the pinion, the weight of the frame on the wheel tending to impart this reverse movement to the pinion, because of the tendency of the plate 14 to be forced back to its former position by the weight of the frame and its attendant parts.

If it is desired to let the drum itself roll on the ground in order that its teeth may dig to their full depth, the wheels may be raised to a position where they will not contact with the ground by imparting to the pinion 20 the reverse of the movement that resulted in the lowering of the wheels. With the raising of the wheels, it is necessary to change the position of the pawls 24 so that they engage the teeth of the pinions 20 in the vicinity of the teeth 19 formed on the vertical members 13.

The scrapers 30 and their attendant arms 31 and bars 35 are so positioned on the rear beam 2 that the cutting edges of the scrapers will contact with the drum between each row of teeth formed circumferentially around the drum. By means of the nuts 40, the scrapers may be made bear upon the drum with the full intensity of the springs 39; or they may be made to stand close to but not in actual contact with the drum, the springs 39 in either instance permitting the scrapers to yield in a direction away from the drum.

The drum having been used to dig up and pulverize the earth, the drag 41 following the drum serves to level the earth subsequent to the digging operation.

Having thus fully described this invention, what is claimed as new and useful, is:—

1. In a cultivator, the combination with a frame, of a toothed drum rotatably mounted in the frame, the teeth being arranged in uniformly spaced circumferential rows on the cylindrical surface of the drum, a plurality of scrapers positioned at uniformly spaced intervals transversely on the frame, said scrapers having pivotal connections with the frame, and resilient means conjoined with each scraper whereby it may be held yieldably against the drum, the scrapers being adapted to contact with the drum between the circumferential rows of teeth thereon.

2. In a cultivator, the combination with a frame, of a toothed drum rotatably mounted in the frame, the teeth being arranged in uniformly spaced circumferential rows, a plurality of scrapers mounted on the frame and adapted to engage the drum between the circumferential rows of teeth, resilient means whereby the scrapers may be held yieldably against the drum, and means for regulating the intensity of the contact between the scrapers and the drum.

3. In a cultivator, the combination with a frame having a forward and rear beam, of a drum rotatably mounted in the frame and provided with uniformly spaced circumferential rows of teeth, arms positioned on the upper edge of the rear beam, bolts passing vertically through the said rear beam and securing the arms in place thereon, the bolts having eyes in those portions which hang below the beam, scrapers pivotally connected to the arms and bearing upon the drum at their free ends between the circumferential rows of teeth, bars pivotally connected with the scrapers and slidably engaging the eyes of the bolts, compression springs in surrounding relation to the bars and compressed between the eyes of the bolts and the scrapers, and nuts engaging the bars and bearing upon the eyes of the bolts, whereby the intensity of the contact between the scraper and the surface of the drum may be regulated.

In testimony whereof I affix my signature.

CLARENCE E. HOLT.

Copies of this patent may be obtained for five cents each, by addressing the "Commissioner of Patents, Washington, D. C."